US008872989B2

(12) United States Patent
Tokumura et al.

(10) Patent No.: US 8,872,989 B2
(45) Date of Patent: Oct. 28, 2014

(54) ELECTRO-OPTICAL DEVICE AND ELECTRONIC APPARATUS

(75) Inventors: Toshiaki Tokumura, Suwa (JP); Akihiko Ito, Tatsuno-machi (JP)

(73) Assignee: Seiko Epson Corporation, Tokyo (JP)

( * ) Notice: Subject to any disclaimer, the term of this patent is extended or adjusted under 35 U.S.C. 154(b) by 115 days.

(21) Appl. No.: 13/602,743

(22) Filed: Sep. 4, 2012

(65) Prior Publication Data

US 2013/0070005 A1 Mar. 21, 2013

(30) Foreign Application Priority Data

Sep. 20, 2011 (JP) ................................ 2011-204297

(51) Int. Cl.
*G02F 1/1335* (2006.01)
*G09G 3/00* (2006.01)
*G09G 3/36* (2006.01)

(52) U.S. Cl.
CPC .............. *G09G 3/003* (2013.01); *G09G 3/3648* (2013.01); *G09G 3/3614* (2013.01); *G09G 2320/0285* (2013.01); *G09G 2340/16* (2013.01)
USPC ........................................................ 349/15

(58) Field of Classification Search
USPC ........................................................ 349/15
See application file for complete search history.

(56) References Cited

U.S. PATENT DOCUMENTS

| | | | | |
|---|---|---|---|---|
| 2009/0018525 | A1 | 1/2009 | Waite et al. | |
| 2009/0289968 | A1 | 11/2009 | Yoshida | |
| 2011/0074938 | A1* | 3/2011 | Nakahata | 348/56 |
| 2011/0279421 | A1* | 11/2011 | Lee et al. | 345/204 |
| 2011/0316989 | A1* | 12/2011 | Imai et al. | 348/51 |

FOREIGN PATENT DOCUMENTS

| | | | |
|---|---|---|---|
| JP | 2009-25436 | A | 2/2009 |
| JP | 2009-128504 | A | 6/2009 |
| JP | 2009-223259 | A | 10/2009 |
| JP | 2010-2898 | A | 1/2010 |
| JP | 2011-75746 | A | 4/2011 |
| JP | 2011-81337 | A | 4/2011 |

* cited by examiner

*Primary Examiner* — Adam J Snyder
*Assistant Examiner* — Roy Rabindranath
(74) *Attorney, Agent, or Firm* — ALG Intellectual Property, LLC

(57) ABSTRACT

A driving circuit applies a voltage according to an assigned grayscale during each unit period of each display period, in such a manner that the applied voltage to a liquid crystal element during one of the unit periods and the applied voltage to the liquid crystal element during the other of the unit periods are opposite in polarity during each of the display periods, and an overdrive control unit enables the drive circuit to perform overdrive of a compensation grayscale according to a display image during the corresponding display period and to a display image during the immediately preceding display period during each of the first and second unit periods of each of the display periods, during each of the display periods.

4 Claims, 7 Drawing Sheets

ELECTRO-OPTICAL DEVICE AND ELECTRONIC APPARATUS

BACKGROUND

1. Technical Field

The present invention relates to a technology which displays right-eye and left-eye images that are given parallax with respect to each other in order for a viewer to perceive stereoscopic image.

2. Related Art

A stereoscopic-viewing method has been proposed which employs a frame-sequential method of alternately displaying right-eye and left-eye images in a time division manner. For example, in JP-A-2009-25436, the technology is disclosed which alternately sets up a display period PR of the right-eye image and a display period PL of the left-eye image, as shown in FIG. 10. Each of the display periods P (PR, PL) is divided into two unit periods U (U1, U2), and a voltage according to a display image is applied to each of the pixels during the unit period U. In the configuration in which a liquid crystal element requiring AC drive to reverse the polarity of the applied voltage is used in each of the pixels, the applied voltage to each of the pixels is set, for example, to a positive polarity during the unit period U1 of each of the display periods P, and to a negative polarity during the unit period U2, as shown in FIG. 10.

An overdrive (overvoltage drive) has been proposed which compensates for the response delay in liquid crystal by applying an overvoltage exceeding a target voltage according to the assigned grayscale, to each of the pixels. For example, in the technology described in JP-A-2009-25436, the configuration (hereinafter referred to as "comparative example") employs a configuration in which the overdrive (OD) is performed during the unit period U1 during which the display image is changed from the immediately preceding image during each of the display periods P as shown in FIG. 10.

However, in the comparison example, because the positive polarity voltage applied to each of the pixels by the overdrive during the unit period U1 of each of the display periods P is different from the negative polarity voltage applied to each of the pixels during the unit period U2 during which the overdrive is not performed, a DC component is applied to each of the pixels during the display period, and, as a result of applying the DC component, characteristic deterioration in each of the pixels (liquid crystal cell) can occur.

SUMMARY

An advantage of some aspects of the invention is to suppress the application of a DC component to each of the pixels with the configuration that applies overdrive in displaying a right-eye image and a left-eye image.

According to an aspect of the invention, an electro-optical device capable of alternately displaying right-eye and left-eye images every display period is provided which includes a plurality of pixels arranged corresponding to intersections between a plurality of scan lines and a plurality of signal lines, a drive circuit applying the voltage according to an assigned grayscale to each of the pixels during each of first and second unit periods of each of display periods in such a manner that the applied voltages to each of the pixels during the first and second unit periods of each of the display periods, respectively, are opposite in polarity, and an overdrive control unit enabling the drive circuit to perform overdrive of a compensation grayscale according to a display image during the corresponding display period and to a display image during the immediately preceding display period during each of the first and second unit periods of each of the display periods, during each of the display periods. In this configuration, the applied voltage to the pixels during the first unit display and the applied voltage to the pixels during the second unit display are opposite in polarity during the display period and the overdrive is performed on each of the pixels during both of the first and second unit periods. Therefore, there is an advantage in that a difference in the applied voltage to the pixel between during the first unit period and during the second unit period decreases, and thus characteristic deterioration in the pixel, resulting from application of a DC component, is suppressed, for example compared with a comparison example in which the overdrive is performed during the first unit period only.

According to the embodiment of the aspect of the invention, the drive circuit sequentially may select each of the scan drives and applies the voltage according to the assigned grayscale to each of the pixels corresponding to the scan line in a selection state, and the overdrive control unit may control the overdrive on each of the pixels by the drive circuit, in such a manner that in a case where the assigned grayscale in the display image during one display period and the assigned grayscale in the display during the display period immediately preceding the one display period are equal to each other, in the pixels corresponding to the first scan line, and the pixels corresponding to the second scan lines selected after the selection of the first scan line among the plurality of scan lines, an amount of overdrive compensation on the pixel corresponding to the second scan line exceeds the amount of overdrive compensation on the pixel corresponding to the first scan line, during one of the display periods. In the aspect of the invention, since the amount of overdrive compensation on the pixels corresponding to the second scan line exceeds the amount of overdrive compensation on the pixel corresponding to the first scan line selected before selection of the second scan line, there is an advantage in that crosstalk of the display image is difficult for a viewer to perceive, compared with a configuration in which the plurality of pixels whose assigned grayscales are equal during one display period and the immediately preceding display period is set to the voltage that causes equal compensation quantities of the overdrive. A specific example of the above embodiment will be described below as a second embodiment.

The electro-optical device according to the aspect of the invention further may further include a memory unit storing a plurality of adjustment values corresponding to positions in the arrangement direction of the plurality of scan lines; and an interpolation unit generating an adjustment value corresponding to each of the scan lines by interpolating the plurality of adjustment values that the memory unit stores. And the overdrive control unit may adjust the amount of overdrive compensation on the pixels corresponding to each of the scan lines, in response to each of the adjustment values generated by the interpolation unit. In this embodiment, since the adjustment value corresponding to each of the scan lines is generated by interpolating the plurality of adjustment values that the memory unit stores, there is an advantage in that the capacity of the memory unit is reduced, for example, compared with a configuration in which the adjustment values corresponding to all of the scan lines are retained.

According to the embodiment of the aspect of the invention, the overdrive control unit may control the overdrive on each of the pixels by the drive circuit, in such a manner that the amount of overdrive compensation on each of the pixels in the first unit period of each of the display periods exceeds the amount of overdrive compensation on the corresponding pixels during the second unit drive following the first unit period during the corresponding display unit. In this embodiment, since the amount of overdrive compensation during the first unit period exceeds the amount of overdrive compensation during the second unit period, there is an advantage in that the crosstalk of the display image is difficult for the viewer to perceive, compared with the configuration in which an amount of overdrive compensation is equally set during the first unit period and the second unit period. A specific example of the above embodiment will be described below as a third embodiment.

According to the aspect of the invention, an electro-optical device capable of displaying right-eye and left-eye images that are stereoscopically viewable with stereoscopic viewing glasses including right-eye and left-eye shutters includes a glasses-control circuit which controls both of the right-eye and left-eye shutters to be in a closed state during a period that includes at least a section of the first unit period during each of the display periods, controls the right-eye shutter to be in an open state during a period that includes at least a section of the second unit period during the display period of the right-eye image and controls the right-eye shutter to be in the closed state, and controls the left-eye shutter to be in the open state during a period that includes at least a section of the second unit period during the display period of the left-eye image and controls the right-eye shutter to be in the closed state.

According to another aspect of the invention, the electro-optical device referred to in the aspects described above includes a variety of electronic apparatuses. For example, a stereoscopic display device which includes the electro-optical device according to the aspect described above and stereoscopic viewing glasses that the glasses-control circuit controls is referred to as an example of an electronic apparatus to which the aspect of the invention is applied.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
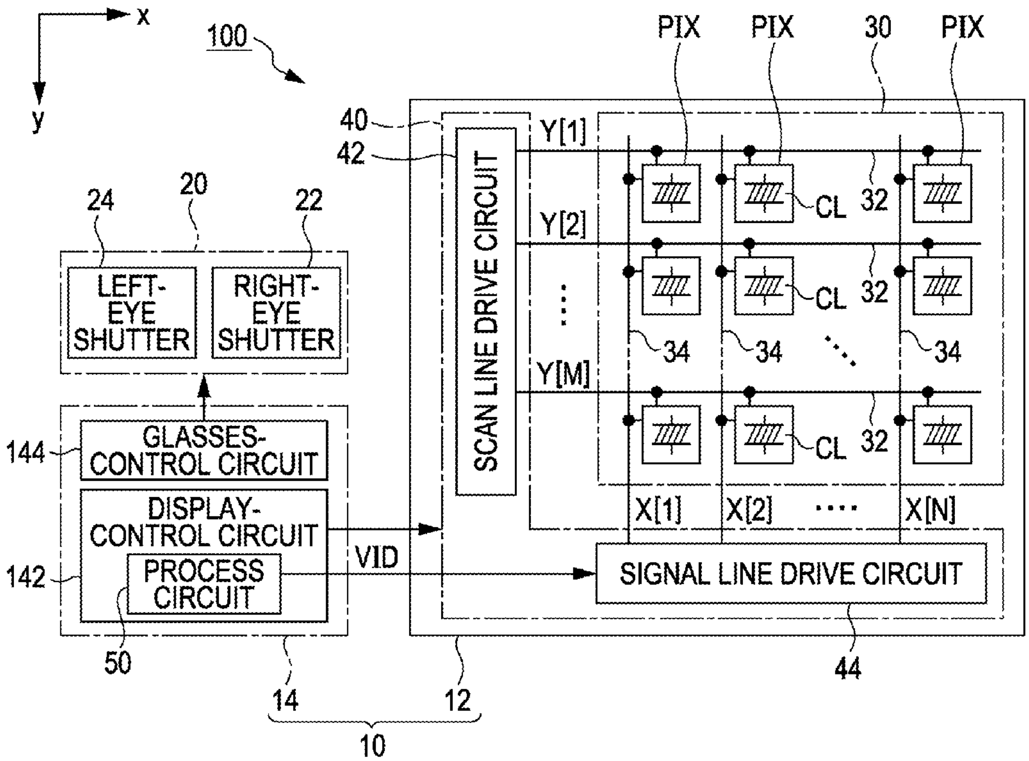
FIG. 1 is a block diagram illustrating a stereoscopic display according to a first embodiment of an aspect of the invention.

FIG. 1 is a block diagram illustrating a stereoscopic display 100 according to a first embodiment of the aspect of the invention. The stereoscopic display 100 is an electronic apparatus that displays a stereoscopic image enabling a viewer to perceive stereoscopic image, by using an active shutter method, and includes an electro-optical device 10 and stereoscopic viewing glasses 20. The electro-optical device 10 alternately displays a right-eye image GR and a left-eye image GL that are given parallax with respect to each other, in a time divided manner.

The stereoscopic viewing glasses 20 are a spectacles-type aid which the viewer wears when visually recognizing the stereoscopic image which the electro-optical device 10 displays, and includes a right-eye shutter 22, positioned before the viewer's right eye and a left-eye shutter 24, positioned before the viewer's left eye. Each of the right-eye and left-eye shutters 22 and 24 is controlled to maintain an open state (penetration state) in which illumination light is permitted to penetrate, or a closed state (light-blocking state) in which the illumination light is blocked from penetrating. For example, a liquid crystal shutter, which changes from the open state to the closed state and vice versa, by changing an orientation direction of the liquid crystal depending on an applied voltage, may be used as the right-eye and left-eye shutters 22 and 24.

The electro-optical device 10 in FIG. 1 includes an electro-optical panel 12 and a control circuit 14. The electro-optical panel 12 includes a pixel unit 30 in which a plurality of pixels PIX (pixel circuit) are arranged, and a drive circuit 40 driving each of the pixels PIX. In the pixel unit 30, M scan lines 32 are formed to extend in the x direction, and N signal lines 34 are formed to extend in the y direction intersecting the x direction (M and N are natural numbers). The plurality of pixels PIX in the pixel section 30 are arranged in a matrix with M columns and N rows corresponding to each interconnection between the scan line 32 and the signal line 34.

Figure 2:
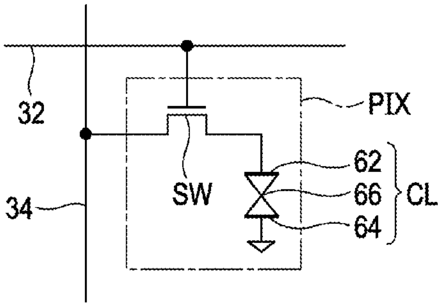
FIG. 2 is a circuit diagram illustrating a pixel circuit.

FIG. 2 is a circuit diagram illustrating each of the pixels PIX. As shown in FIG. 2, each of the pixels PIX includes a liquid crystal cell CL and a selection switch SW. The liquid crystal cell CL is an electro-optical element that is configured by pixel and common electrodes 62 and 64 which are opposite to each other, and a liquid crystal 66 between the pixel and common electrodes 62 and 64. Transmission (display grayscale) of the liquid crystal 66 changes according to the applied voltage between the pixel and common electrodes 62 and 64. The selection switch SW is configured by an N-channel thin film transistor whose gate is connected to the scan line 32, and is interposed between the liquid crystal cell CL and the signal line 34 to control electric connection (conduction/insulation) between the liquid crystal cell CL and the signal line 34. Therefore, the pixel PIX (liquid crystal cell CL) displays a grayscale according to potential (grayscale potential X[n] described below) of the signal 34 that is present when the selection switch SW is controlled to be in an on state. In addition, the configuration may be employed in which an additional capacitor is connected in parallel to the liquid crystal cell CL.

The control circuit 14 in FIG. 1 includes a display-control circuit 142 controlling the electro-optical panel 12, and a glasses-control circuit 144 controlling the stereoscopic viewing glasses 20. The display-control circuit 142 controls the drive circuit 40, to display the right-eye image GR and the left-eye image GL on the pixel unit 30 in an alternating way, in a time division manner. For example, the display-control circuit 142 generates an image signal VID assigning the grayscale of each of the pixels PIX in the pixel unit 30 and supplies the image signal VID to the drive circuit 40. Furthermore, the configuration may be employed in which the display-control circuit 142 and the glasses-control circuit 144 is built into a single integrated circuit, or the configuration may be employed in which the display-control circuit 142 and the glasses-control circuit 144 is built into separated integrated circuits, respectively.

Figure 3:
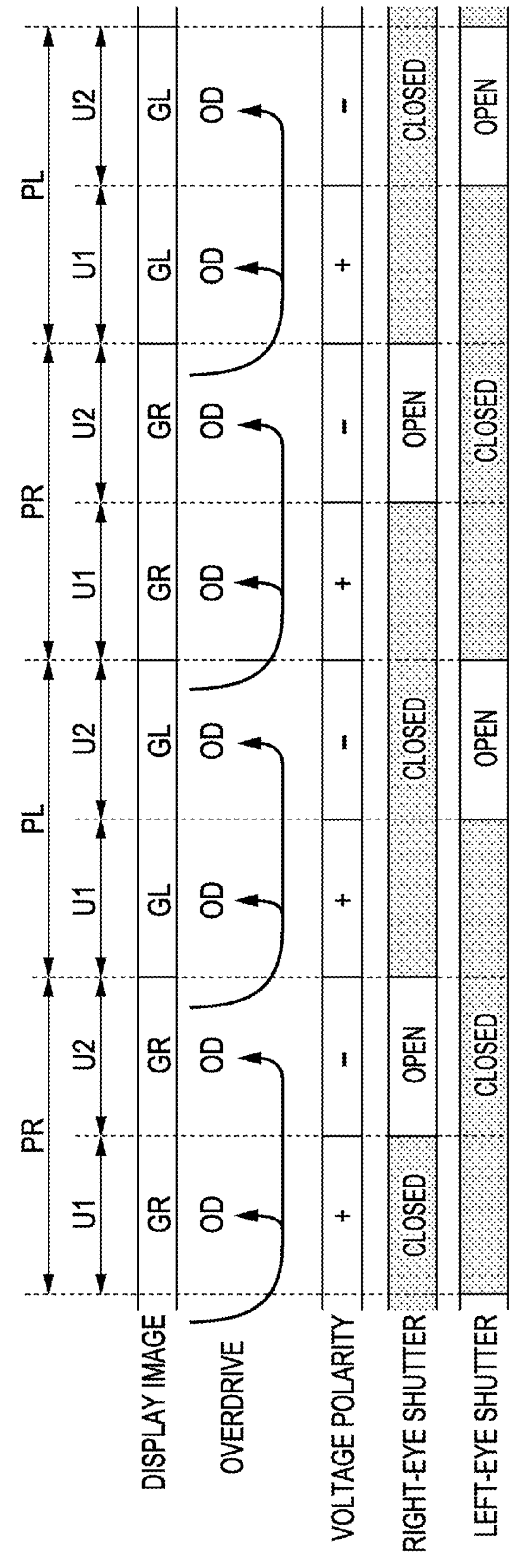
FIG. 3 is an explanatory view illustrating operation of a first embodiment.

FIG. 3 is an explanatory view illustrating an operation of the electro-optical device 10. As shown in FIG. 3, an operation period of the electro-optical device 10 is divided into a plurality of display periods P (right-eye display periods PR and left-eye display periods PL). During the right-eye display period PR, the right-eye image GR is displayed on the pixel unit 30, and during the left-eye display period PL, the left-eye image GL is displayed on the pixel unit 30. The right-eye display period PR and the left-eye display period PL are alternately arranged, along the time axis. Each of the display periods P (PR, PL) is divided into two unit periods U (U1, U2), each with an equal time duration. The unit period U2 follows the unit period U1.

A drive circuit 40 in FIG. 1 is a circuit that applies the voltage according to a grayscale (hereinafter referred to as "an assigned grayscale") that the image signal VID supplied from the display-control circuit 142 assigns to each of the pixels PIX, to the liquid crystal cell CL of each of the pixels PIX, and includes a scan line drive circuit 42 and a signal line drive circuit 44.

The scan line drive circuit 42 sequentially selects each of the M scan lines 32 in the given order by supplying a scan signal Y[1] to Y[M] corresponding to each of the scan lines 32. Specifically, the scan signal Y[m] supplied to the scan lines 32 in the m (m=1 to M)-th row is set to selection potential (potential indicating the selection of the scan line 32) during the m-th selection period among M selection periods (horizontal scan periods), during each of the unit periods U1 and U2 of each of the display periods P. When the scan line 32 sets the scan signal Y[m] to the selection potential, each of the selection switches SW of the N pixels PIX in the m-th row is changed to the on state.

The signal line drive circuit 44 in FIG. 1 is synchronized with the selection of each of the scan lines 32 by the scan line drive circuit 42, and thus supplies grayscale potential X[1] to X[N] to each of the N signal lines 34. During the selection period during which the scan lines 32 in the m-th row are selected during each of the unit periods U of the right-eye display period PR, the grayscale potential X[n] supplied to the signal line 34 in the n (n=1 to N)-th column is set to the potential according to the assigned grayscale of the pixel PIX positioned in the m-th row and n-th column in the right-eye image GR. Likewise, during the m-th selection period of each of the unit periods U of the left-eye display period PL, the grayscale potential X[n] is set to the potential according to the assigned grayscale of the pixel PIX positioned in the m-th row and n-th column in the left-eye image GL.

That is, during the right-eye display period PR, the voltage according to the right-eye image GR is applied to the liquid crystal cell CL of each of the pixels PIX every unit period U, and thus the right-eye image GR is displayed on the pixel unit 30 during each of the unit periods U. During the left-eye display period PL, the voltage according to the left-eye image GL is applied to the liquid crystal cell CL of each of the pixels PIX every unit period U, and thus the left-eye image GL is displayed on the pixel unit 30 during each of the unit periods U.

Furthermore, the drive circuit 40 periodically reverses the polarity of the applied voltage to the liquid crystal cell CL of each of the pixels PIX. Specifically, as shown in FIG. 3, the drive circuit 40 sequentially reverses the polarity of the applied voltage to the liquid crystal cell CL (for example, the polarity of the grayscale potential X[n]) every unit period U. That is, the applied voltage to each of the pixels PIX during the unit period U1 of each of the display periods P and the applied voltage to each of the pixels PIX during the unit period U2 of each of the display periods P are set to be opposite in polarity. For example, the polarity of the applied voltage to the liquid crystal cell CL is set to the positive polarity (for example, a state in which the potential of the pixel electrode 62 exceeds the potential of the common electrode 64) during the unit period U1 of each of the display periods P, and the polarity of the applied voltage to the liquid crystal cell CL is set to the negative polarity (for example, a state in which the potential of the pixel electrode 62 drops below the potential of the common electrode 64) during the unit period U2 of each of the display periods P.

Figure 4:
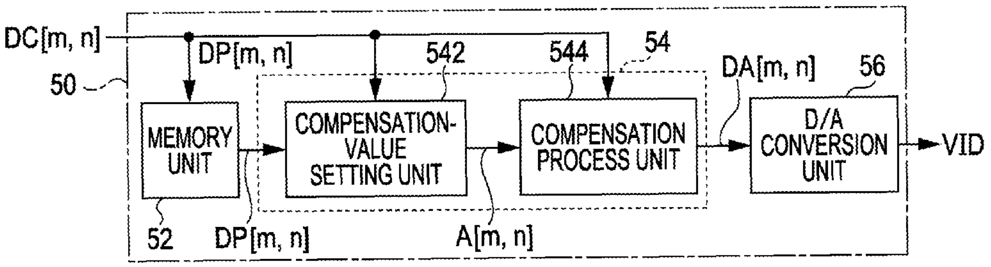
FIG. 4 is a block diagram illustrating a process circuit.

The display-control circuit 142 of the control circuit 14 in FIG. 1 includes a process circuit 50 that enables the drive circuit 40 to perform overdrive (OD). FIG. 4 is a block diagram illustrating a process circuit 50. As shown in FIG. 4, grayscale data DC[m,n] (DC[1,1] to DC[M,N]) designating the grayscale of the right-eye image GR or the grayscale of the left-eye image GL is sequentially supplied to the process circuit 50 from an outside circuit (not shown) every unit period U of each of the display periods P. The grayscale data DC[m,n] corresponding to each of the unit periods U1 and the unit period U2 of one display period P (PR,PL) is common. One display period P corresponding to the latest grayscale data DC [m,n] supplied to the process circuit 50 is hereinafter referred to as a "focus display period P". Furthermore, the grayscale data DC [m,n] processed by another circuit in the display-control circuit 142 may be supplied to the process circuit 50.

As shown in FIG. 4, the process circuit 50 includes a memory unit 52, an OD (overdrive) control unit 54, and a D/A conversion unit 56. The memory unit 52 is frame memory that stores grayscale data DC [m,n] on one image corresponding to the unit period U2 of the immediately preceding display period P (hereinafter referred to "immediately preceding display period P") of the focus display period P, as grayscale data DP [m,n] (DP[1,1] to DP[M,N]). The grayscale data DP [m,n] that the memory unit 52 retains is sequentially updated every display period P. That is, during the period during which each grayscale data DC [m,n] on the right-eye image GR corresponding to each of the unit periods U (U1 and U2) of the right-eye display period PR is supplied to the process circuit 50, each grayscale data DP [m,n] on the left-eye image GL corresponding to the unit period U2 (or the unit period U1) of the immediately preceding left-eye display period PL is retained in the memory unit 52. Likewise, during the period during which each grayscale data DC [m,n] on the left-eye image GL corresponding to each of the unit periods U (U1 and U2) of the left-eye display period PL is supplied to the process circuit 50, each grayscale data DP [m,n] on the right-eye image GR corresponding to the unit period U2 (or the unit period U1) of the immediately preceding right-eye display period PR is retained in the memory unit 52.

An OD control unit 54 in FIG. 4, enables the drive circuit 40 to perform the overdrive of a compensation grayscale according to the display image (the grayscale data DC [m,n] of one of the right-eye image GR and the left-eye image GL) during the focus display period P and the display image (the grayscale data DP [m,n] of the other of the right-eye image GR and the left-eye image GL) during the immediately preceding display period P, during both of the unit periods U1 and U2 of each of the display periods P. As shown in FIG. 4, the OD control unit 54 of the first embodiment has a configuration including a compensation-value setting unit 542 and a compensation process unit 544.

The compensation-value setting unit 542 sets a compensation value A [m,n] (A[1,1] to A[M,N]) for each of the pixels PIX every unit period U according to each grayscale data DC [m,n] for the focus display period P, supplied from the outside circuit, and each grayscale data DP [m,n] for the immediately preceding display period P, retained in the memory unit 52. The compensation value A [m,n] defines an increased amount of the applied voltage to each of the pixels PIX, by the overdrive performed by the drive circuit 40. Specifically, the greater a difference between the grayscale data DC [m,n] and the grayscale data DP [m,n] (that is, the greater a change in the grayscale of the pixel PIX between the immediately preceding display period P and the focus display period P) is, the greater the value to which the compensation value A [m,n] is set, and when the grayscale data DC [m,n] agrees with the grayscale data DP [m,n], the compensation value A [m,n] is set to zero (without the overdrive). A look-up table listing a correspondence between a difference value between the grayscale data DC [m,n] and the grayscale data DP [m,n] and each compensation value A [m,n] may be suitably employed as the compensation-value setting unit 542.

The compensation process unit 544 performs compensation on each grayscale data DC [m,n] on each of the pixels PIX, which is supplied from the outside circuit, according to the compensation value A [m,n] that the compensation-value setting unit 542 sets for that pixel PIX, and thus generates grayscale data DA [m,n] (DA[1,1] to DA[M,N]). For example, an addition circuit, which adds the grayscale data DC [m,n] and the compensation value A [m,n] to generate the grayscale data DA [m,n], may be used as the compensation process unit 544. As is apparent from the above description, the configuration may be also employed in which the compensation value A [m,n] is not calculated for the pixel PIX when the grayscale data DC [m,n] and the grayscale data DP [m,n] agrees with each other (the configuration in which the grayscale data DC [m,n] is output as the grayscale data DA [m,n] without any compensation). A D/A conversion unit 56 converts the grayscale data DA [m,n] of each of the pixel PIX that the compensation process unit 544 sequentially generates, into an analog image signal VID and supplies the result to the drive circuit 40 (the signal line drive circuit 44).

As described above, the grayscale data DA [m,n] according to the grayscale data DC [m,n] for the unit period U1 of the focus display period P and to the grayscale data DP [m,n] for the immediately preceding display period P (the unit period U2) is generated for the unit period U1, and the grayscale data DA [m,n] according to the grayscale data DC [m,n] for the unit period U2 of the focus display period P and to the grayscale data DP [m,n] for the immediately preceding display period P (the unit period U2) is generated for the unit period U2. Therefore, the overdrive of the compensation grayscale according to a difference between the display image of the focus display period P and the display image of the immediately preceding display period P is performed by the drive circuit 40 during both of the unit period U1 and the unit period U2 of the immediately preceding display period P.

That is, in the first embodiment, during each of the display periods P (PR, PL), the voltage applied to the liquid crystal cell CL during the unit period U1 and the voltage applied to the liquid crystal cell CL during the unit period U2 are opposite in polarity, and the overdrive is performed on each of the pixels PIX during both of the unit period U1 and the unit period U2. Therefore, there is an advantage in that a difference in the applied voltage to the liquid crystal cell CL is reduced between during the unit period U1 and during the unit period U2, and characteristic deterioration in the liquid crystal 66, resulting from the application of the DC component, is suppressed (in addition, the reliability of the apparatus is improved), compared with the comparison example in which the overdrive is performed during the unit period U1 of each of the display periods P only.

The glasses-control circuit 144 of the control circuit 14 in FIG. 1 controls each of the states (on state/closed state) of the right-eye shutter 22 and the left-eye shutter 24 of the stereoscopic viewing glasses 20 for synchronization with an operation of the electro-optical panel 12, Specifically, the glasses-control circuit 144, as shown in FIG. 3, controls both of the right-eye shutter 22 and the left-eye shutter 24 to be in the closed state during the unit period U1 of the display periods P (PR, PL). Furthermore, the glasses-control circuit 144, controls the right-eye shutter 22 to be in the open state during the unit period U2 of the right-eye display period PR, and controls the left-eye shutter 24 to be in the closed state, and controls the left-eye shutter 24 to be in the open state during the unit period U2 of the left-eye display period PL, and controls the right-eye shutter 22 to be in the closed state.

Therefore, the right-eye image GR that is displayed on the pixel unit 30 during the unit period U2 of the right-eye display period PR penetrates the right-eye shutter 22 and arrives at the right eye of the viewer, and is blocked by the left-eye shutter 24. On the other hand, the left-eye image GL that is displayed on the pixel unit 30 during the unit period U2 of the left-eye display period PL penetrates the left-eye shutter 24 and arrives at the left eye of the viewer, and is blocked with the right-eye shutter 22. The viewer perceives stereoscopic image in the display image by visually recognizing with his right eye the right-eye image GR that penetrates the right-eye shutter 22, and by visually recognizing with his left eye the left-eye image GL that penetrates the left-eye shutter 24.

The left-eye image GL displayed during the immediately preceding left-eye display period PL (the unit period U2) is sequentially updated with the right-eye image GR, in units of a row, during the unit period U1 of the right-eye display period PR, and the right-eye image GR displayed during the immediately preceding right-eye display period PR (the unit period U2) is sequentially updated with the left-eye image GL, in units of a row, during the unit period U1 of the left-eye display period PL. That is, the right-eye image GR and the left-eye image GL are concurrently present during the unit period U1 of each of the display periods P. In the first embodiment, since both of the right-eye shutter 22 and the left-eye shutter 24 maintain the closed state during the unit period U1 of each of the display periods P, concurrent presence (crosstalk) of the right-eye image GR and the left-eye image GL is unperceivable to the viewer. That is, since the right-eye image GR and the left-eye image GL are reliably separated from each other for the right eye and the left eye, respectively, the stereoscopic image is clearly perceivable to the viewer.

Second Embodiment

The second embodiment of the aspect of the invention will be described below. Furthermore, elements in embodiment to be described below, when they are equivalent in operation or function to the elements in the first embodiment, are given reference numerals referred to in the above description and are accordingly not described.

Figure 5:
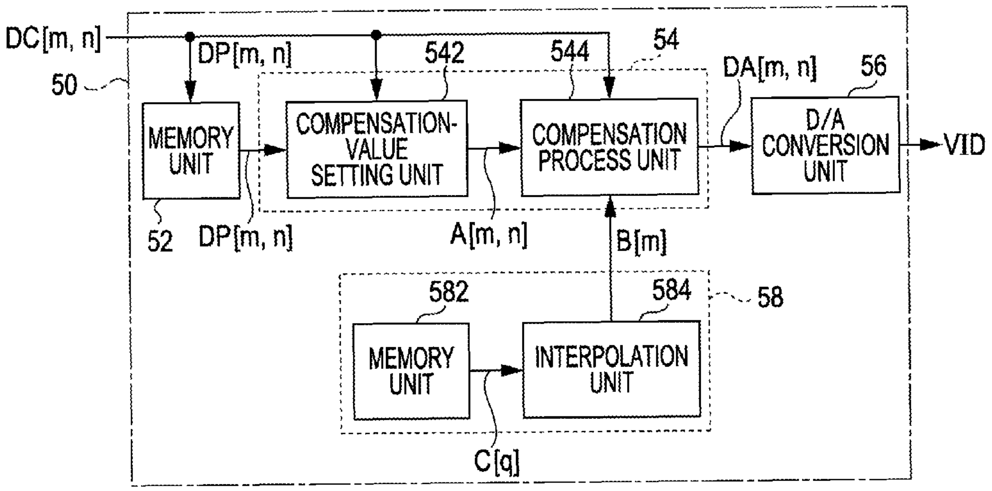
FIG. 5 is a block diagram illustrating a process circuit in a second embodiment.

FIG. 5 is a block diagram illustrating a process circuit 50 in the second embodiment. As shown in FIG. 5, the process circuit 50 of the second embodiment has a configuration in which an adjustment-value setting unit 58 is added to the process circuit 50 of the first embodiment. Furthermore, the second embodiment has the same configuration, in which during each of the display periods P (PR, PL), the applied voltage to each of the pixels PIX during the unit period U1 and the applied voltage to each of the pixels PIX during the unit period U2 are set to be opposite in polarity, and the overdrive is performed on each of the pixels PIX during both of the unit period U1 and the unit period U2, as the first embodiment. Therefore, the second embodiment has the same effect as the first embodiment.

An adjustment-value setting unit 58 in FIG. 5 sets M adjustment values B[m] (B[1] to B[M]) that are in response to different scan lines 32. A compensation process unit 544 of the second embodiment performs compensation on each grayscale data DC [m,n] of each of the pixels PIX according to a compensation value A [m,n] that the compensation-value setting unit 542 sets and to an adjustment value B[m] that the adjustment-value setting unit 58 sets, and thus generates a grayscale data DA [m,n] (DA [1,1] to DA[m,n]). For example, the compensation process unit 544 add a multiplication value, which is a product of the compensation value A [m,n] of each of the pixels PIX in the m-th row times the adjustment value B [m] of the m-th row, to the grayscale data DC [m,n], and thus generates the grayscale data DA [m,n] (DA [m,n]=DC [m,n]+A[m,n]·B[m]). Therefore, when it is assumed that the grayscale data DC [m,n] and the compensation value A [m,n] are fixed, the larger the adjustment value B[m] of the scan line 32 to which the pixel PIX corresponds, the larger the amount of overdrive compensation (that is, an increase in the applied voltage is large) performed on the pixel PIX.

In the configuration in which the overdrive is performed during both of the unit period U1 and the unit period U2 of each of the display periods P as in the first and second embodiments, in terms of preventing the application of an excessive voltage to the liquid crystal cell CL, it is necessary to suppress the increase in the applied voltage by the overdrive performed during each of the unit periods U, compared with the comparison example in which the overdrive is performed during the unit period U1 only. However, when suppressing the increase in the voltage by the overdrive, the response speed of a liquid crystal 66 cannot be sufficiently ensured. Therefore, when the response speed of the liquid crystal 66 is insufficient, the change in the display grayscale of each of the pixels PIX is not finished even at the point in time when the unit period U2 of each of the display periods P starts, and thus concurrent presence (crosstalk) of the right-eye image GR and the left-eye image GL is perceivable to the viewer during the unit period U2. The later the selection order of the scan line 32, during the unit period U1 (that is, the scan line 32 close to the M-th row), which the pixel PIX corresponds to, the shorter the time from the supply of the grayscale potential X[n] (the drive start of the liquid crystal 66) to the start of the unit period U2. Therefore, the closer the position is to the scan line 32 in the M-th row selected last among the pixel units 30, the more easily the crosstalk tends to manifest itself at that position.

In the second embodiment, considering this tendency, the adjustment-value setting unit 58 sets each adjustment value B[m] (B[1] to B[M]), in such a manner that even though the grayscale data DC [m,n] and the compensation value A [m,n] (the difference value between the grayscale data DC [m,n] and the grayscale data DP [m,n]) are common to the plurality of pixels PIX, the closer the pixel PIX is to the M-th row in the pixel unit 30, the larger the amount of overdrive compensation performed on the pixel PIX (that is, an increase in the applied voltage is large). Specifically, the closer the scan line 32 to which the adjustment value B[m] corresponds is positioned to the M-th row among the M scan lines 32, the larger the value (that is, a value increasing an amount of voltage increased by the overdrive) which the adjustment value B[m] is set to. In a case of focusing on one randomly chosen scan line 32 (hereinafter referred to as "the first scan line") and another scan line 32 selected after the selection of the first scan line 32 (hereinafter referred to as "the second scan line") among the scan lines 32, the adjustment value B[m] of the second scan line 32 may be set to a value greater than the adjustment value B[m] of the first scan line 32, in such a manner that an amount of overdrive compensation for each of the pixels PIX corresponding to the second scan line 32 exceeds an amount of overdrive compensation for each of the pixels PIX corresponding to the first scan line 32. Furthermore, in a case of focusing on the response speed of the liquid crystal 66, each adjustment value B[m] may be set in such a manner that the closer the liquid crystal 66 is positioned to the M-th row selected last among the M scan lines 32, the higher the response speed.

Figure 6:
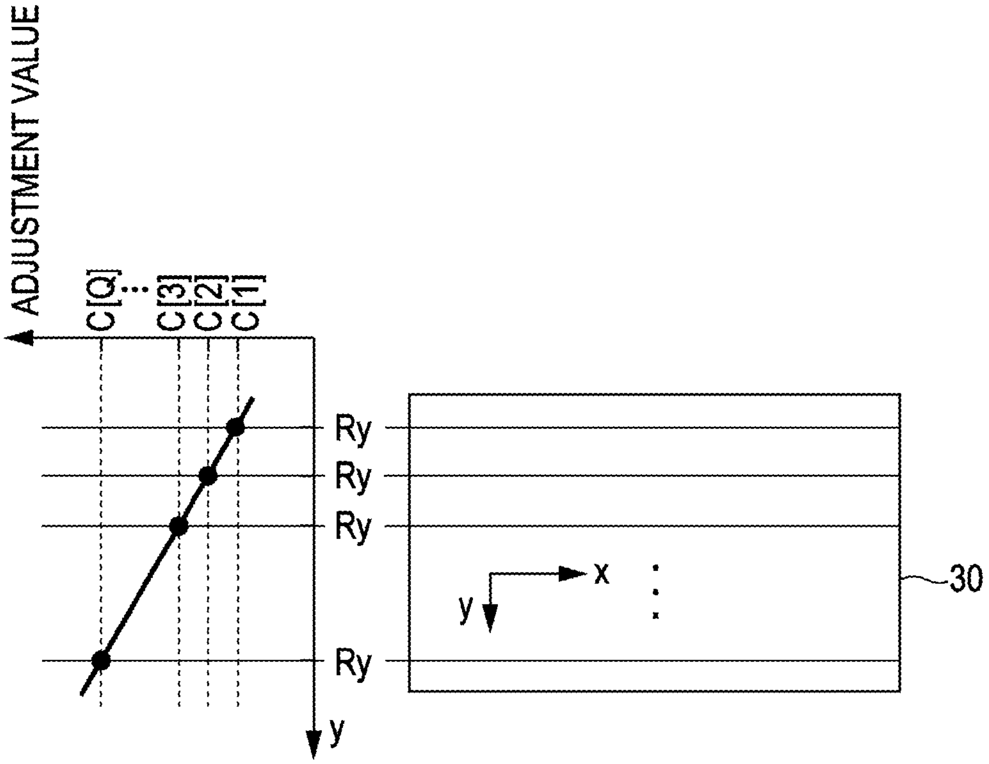
FIG. 6 is an explanatory view illustrating interpolation of an adjustment value.

As shown in FIG. 5, the adjustment-value setting unit 58 of the second embodiment is configured by a memory unit 582 and an interpolation unit 584. The memory unit 582, as shown in FIG. 6, stores Q adjustment values C[q] (C[1] to C[Q]) corresponding to different positions (rows) Ry, in the y direction within the pixel unit 30. The memory unit 582 is configured by such nonvolatile memory as ROM (Read Only Memory) or EPROM (Erasable Programmable ROM). The number Q of the adjustment values C[q] that the memory unit 582 stores is smaller than the number M of the scan lines 32. For example, the adjustment value C[q] is prepared for each of areas that are a result of equally dividing the pixel unit 30 by Q in the y direction.

The interpolation unit 584 of FIG. 5 interpolates the Q adjustment values C[1] to C[Q] that the memory unit 582 stores, and thus generates the M adjustment values B[1] to B[M] corresponding to the different scan lines 32. In the interpolation by the interpolation unit 584, a well-known interpolation operation, is suitably employed such as a linear interpolation. As is apparent from the above description, the closer a position Ry to which the adjustment value C[q] corresponds is to the positive side of the y direction (that is, a position Ry close to the M-th row), among the Q adjustment values C[1] to C[Q] that the memory unit 582 stores, the greater a value the adjustment value C[q] which is set to. Each adjustment value B[m] generated by the interpolation unit 584 is applied to the generation of the grayscale data DA [m,n] by the compensation process unit 544.

As described above, in the second embodiment, in a case of focusing on the plurality of pixels PIX to which the assigned grayscale (the grayscale data DC [m,n]) in the display image during the focus display period P and the assigned grayscale (the grayscale data DP [m,n]) in the display image during the immediately preceding display period P are common, the later the pixel PIX (the pixel PIX close to the M-th row) is selected by the scan line drive circuit 42 in the pixel unit 30, the greater the voltage to which the amount of overdrive compensation is set. Therefore, in terms of suppressing the application of an excessive voltage to the liquid crystal cell CL, even in a case of suppressing the increase in the applied voltage by the overdrive during each of the unit periods U of the display period P, there is an advantage in that the crosstalk of the display image is difficult for the viewer to perceive.

Furthermore, since the adjustment value B[1] to B[M] is calculated every row by interpolation of the Q adjustment values C[1] to C[Q] retained in the memory unit 582, there is an advantage in that the capacity necessary in the memory unit 582 is reduced, for example, compared with the configuration in which the M adjustment values B[1] to B[M] are stored in the memory unit 582. Above all, in a case where the capacity of the memory unit 582 is not a big issue, the configuration may be employed in which the M adjustment values B[1] to B[M] is retained in advance in the adjustment-value setting unit 58 (that is, the configuration in which the interpolation unit 584 is removed).

Third Embodiment

In the first embodiment, an amount of overdrive compensation (strength) is equally set during a unit period U1 and a unit period U2 of each of display periods P. An OD control unit 54 of the third embodiment controls a drive circuit 40 in such a manner that the amount of overdrive compensation during each of the unit periods U1 exceeds the amount of overdrive compensation during the immediately following unit period U2.

For example, a compensation-value setting unit 542 retains respective look-up tables listing a correspondence relationship between a difference value between the grayscale data DC [m,n] and the grayscale data DP [m,n] and each compensation value A [m,n] for the unit period U1 and the unit period U2. The compensation value A [m,n] corresponding to each difference value in the look-up table for the unit period U1 is set to a value greater than the compensation value A [m,n] corresponding to each difference value in the look-up table for the unit period U2. A compensation-value setting unit 542 sets the compensation value A [m,n] for the grayscale data DC [m,n] corresponding to the unit period U1, using the look-up table for the unit period U1, and sets the compensation value A [m,n] for the grayscale data DC [m,n] corresponding to the unit period U2, using the look-up table for the unit period U2.

In the third embodiment described above, since the strength (an amount of compensation) of the overdrive during the unit period U1 exceeds the strength of the overdrive during the unit period U2, the liquid crystal 66 of the liquid crystal element CL during the unit period U1 of the display period P responds at a high speed, compared with during the unit period U2. Therefore, there is an advantage in that the crosstalk of the display image is difficult for the viewer to perceive, compared with the first embodiment in which the equal overdrive is performed during the unit period U1 and the unit period U2.

Furthermore, in the third embodiment, since the overdrive during the unit period U1 strengthens, compared with during the unit period U2, the applied voltage to the liquid crystal cell CL during the unit period U1 is different from-than that during the unit period U2. However, there is a reliable effect of suppressing the application of the DC component to the liquid crystal cell CL, compared with the configuration in which the overdrive is performed during the unit period U1 of each of the display periods P only. As is apparent from the above description, the configuration in which the amount of overdrive compensation is equally set during the unit period U1 and the unit period U2 as in the first and second embodiments is suitable in terms of effectively suppressing the application of the DC component to the liquid crystal cell CL.

Modified Example

The embodiments described above may come in a wide range of variations. Specific modifications are described below. Two or more examples randomly selected from the following description, when not in conflict with each other, may be combined in a suitable way.

(1) The specific configuration of the OD control unit 54 is modified in a suitable manner. Specifically, the OD control unit 54 including the compensation-value setting unit 542 and the compensation process unit 544 is proposed as an example in the first embodiment, but the configuration is suitable in which the look-up table listing a correspondence between a combination of the grayscale data DC [m,n] and the grayscale data DP [m,n] (the difference value between the two) and the after-compensation grayscale data DA [m,n] is used as the OD control unit 54 (that is the configuration in which the compensation value A [m,n] is removed). That is, the OD control unit 54 in each of the embodiments described above is broadly defined as an element that enables the drive circuit 40 to perform the overdrive on each of the pixels PIX during both of the unit period U1 and the unit period U2 of each of the display periods P.

(2) The embodiment of reversing the polarity of the applied voltage to the liquid crystal cell CL is not limited to the example described above. For example, the polarity of the applied voltage to the liquid crystal cell CL may be set to the negative polarity during the unit period U1 of each of the display periods P and may be set to the positive polarity during the unit period U2. Furthermore, a configuration may be employed in which the polarity of the applied voltage to the liquid crystal cell CL during the unit period U1 and the unit period U2 is cyclically reversed every given number (single or plural) of the display periods P.

(3) In each of the embodiments described above, each display period P is equally divided by two into the unit period U1 and the unit period U2, but the number of the unit periods U in the display period P is any number. For example, the display period P may be divided into four unit periods U and the applied voltages to the liquid crystal cell CL are set to be opposite in polarity during the first-half two unit periods U and during the second-half two unit periods. As is apparent from the example, in a case where two of the unit periods U1 are focused on and the applied voltage to the pixels PIX during the one of the unit periods U1 and the applied voltage to the pixels PIX during the other of the unit periods U1 are set to be opposite in polarity during the display P, the configuration may be enough in which the overdrive is performed during both of the unit period U1 and the unit period U2, and the number of the unit periods U in the display period P may be an arbitrary number.

(4) In the second embodiment, the later the selection time of the scan drive 32 to which the pixel PIX corresponds, the larger the amount of overdrive compensation performed on the pixel during both of the unit period U1 and the unit period U2 of each of the display periods P. However, since the crosstalk of the display image is obvious especially during the unit period U1 during which the right-eye image GR is updated with the left-eye image GL and vice versa, an operation in which the later the selection time of the scan line 32 to which the pixel PIX corresponds, the greater the voltage to which the amount of overdrive compensation is set may be performed during the unit period U1 of each of the display periods P only. That is, during the unit period U2 of each of the display periods P, the amount of overdrive compensation is set independently of the y direction position of each of the pixel PIX (the selection time of the scan line 32).

(5) In each of the embodiments described above, the right-eye shutter 22 is changed from a closed state to an open state at the ending point of the unit period U1 of the right-eye display period PR, but the time when the right-eye shutter 22 is changed from the closed state to the open state is suitably changed. For example, in the configuration in which the right-eye shutter 22 is changed to the open state at or before the ending point of the unit period U1 of the right-eye display period PR, concurrent presence of the right-eye image GR and the left-eye image GL during the unit period U1 is slightly perceivable to the viewer, but the brightness of the display image may be improved. On the other hand, in the configuration in which the right-eye shutter 22 is changed to the open state at or after the ending point of the unit period U1 of the right-eye display period PR, the brightness of the display image decreases, but perceiving by the viewer of concurrent presence of the right-eye image GR and the left-eye image GL may be reliably prevented. Likewise, the configuration may be employed in which the time when the right-eye shutter 22 is changed from the open state to the closed state is set to at or before the ending point of the unit period U2 of the right-eye display period PR (the brightness of the display image decreases, but concurrent presence of the right-eye image GR and the left-eye image GL is prevented), or set to at or after the ending point of the unit period U2 of the right-eye display period PR (a slight concurrent presence of the right-eye image GR and the left-eye image GL during the unit period U1 of the left-eye display period PL is perceivable, but the brightness of the display image increases). Furthermore, the time when concurrent presence of the right-eye image GR and the left-eye image GL is difficult for the viewer to perceive depends upon the relationship between the response characteristic of the right-eye shutter 22 and the left-eye shutter 24 and the response characteristic of an electro-optical panel 12 (liquid crystal cell CL) as well. Therefore, the time when the right-eye shutter 22 is changed from the closed state to the open state, or from the open state to the closed state is determined based on a variety of factors including a priority of preventing concurrent presence of the right-eye image GR and the left-eye image GL from being perceivable to the viewer and a priority of ensuring the brightness of the display image (balance between the two priorities), and the relationship between the response characteristic of the stereoscopic viewing glasses 20 and the response characteristic of the electro-optical panel 12. The right-eye shutter 22 is described above, but all of this is true for the period of time when the left-eye shutter 24 opens and closes.

As is apparent from the above description, the period of time when the right-eye shutter 22 maintains the open state is broadly defined as a period of time that includes at least a section of the unit period U2 of the right-eye display period PR (regardless of whether or not a rear section of the immediately preceding unit period U1 is included). Likewise, the period of time when the left-eye shutter 24 maintains the open state is broadly defined as a period of time that includes at least a section of the unit period U2 of the left-eye display period PL (regardless of whether or not a rear section of the immediately preceding unit period U1 is included). Furthermore, the period of time when both of the right-eye shutter 22 and the left-eye shutter 24 are controlled to be in the closed state is broadly defined as a period of time that includes at least a section of the unit period U1 of each of the display periods P (PR, PL) (regardless of whether or not a front section of the immediately following unit period U2 is included).

(6) The electro-optical element (display element) is not limited to the liquid crystal cell CL. For example, an electrophoresis element may be used as the electro-optical element. That is, electric potential optical elements are broadly defined as a display element that varies in optical characteristics (for example, transmission) according to an electric operation (for example, the application of the voltage).

Application Example

Figure 7:
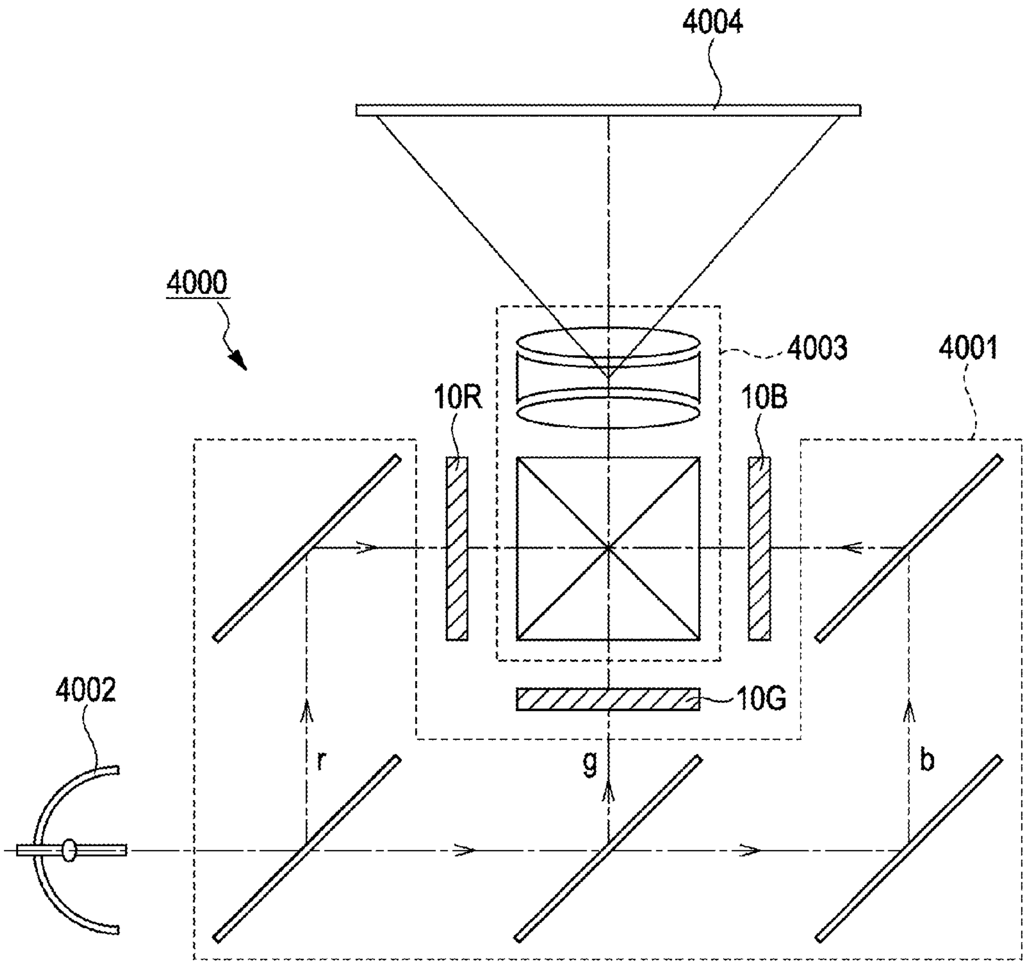
FIG. 7 is a perspective view illustrating an electronic apparatus (projection-type display device).
Figure 8:
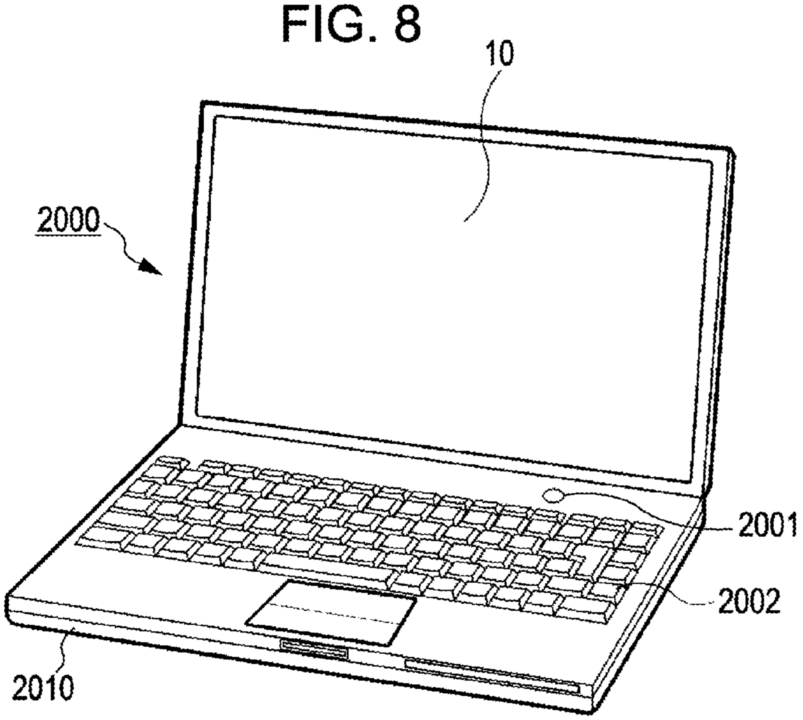
FIG. 8 is a perspective view illustrating the electronic apparatus (portable personal computer).
Figure 9:
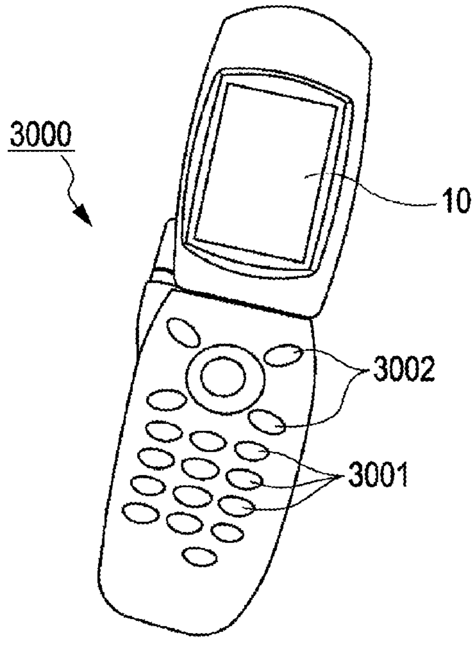
FIG. 9 is a perspective view illustrating the electronic apparatus (portable telephone).
Figure 10:
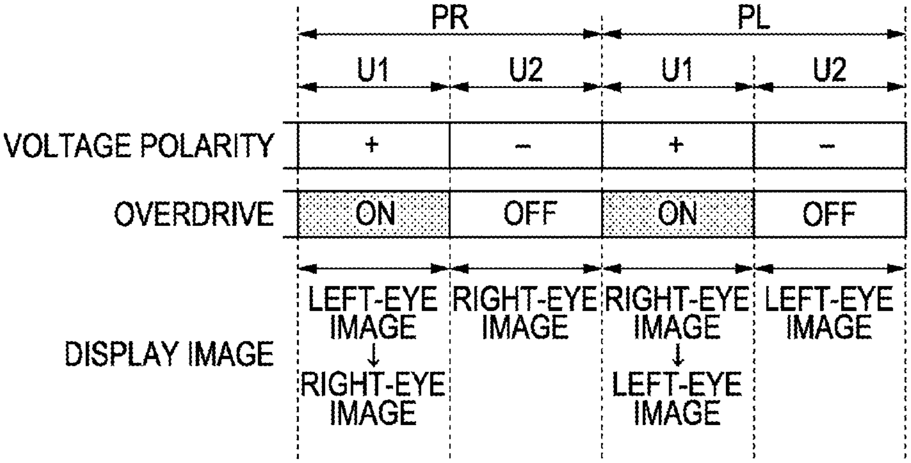
FIG. 10 is an explanatory view illustrating stereoscopic view operation of a comparison example.

The electro-optical device 10 referred to in each of the embodiments described above may be used in a variety of electronic apparatuses. In FIGS. 7 to 9, specific examples of the electronic apparatus which uses the electro-optical device 10 are shown.

FIG. 7 is a schematic diagram of a projection-type display device (three-panel projector) 4000 which is equipped with the electro-optical device 10. The projection-type display device 4000 is equipped with three of the electro-optical devices 10 (10R, 10G, 10B) corresponding to the display colors (red, green, blue), respectively. An illumination optical system 4001 supplies a red component r to the electro-optical device 10R, a green component g to the electro-optical device 10G, and a blue component b to the electro-optical device 10B, among outgoing beams from an illumination device (light source) 4002. Each electro-optical device 10 serves as an optical modulation device (light valve) modulating each monochromatic light supplied from the illumination optical system 4001, according to the display image. A projection optical system 4003 synthesizes the outgoing beam emitted from each of the electro-optical devices 10 and projects a synthesized beam to a projection surface 4004. The viewer visually recognizes a stereoscopic image projected on the projection surface 4004 with stereoscopic-viewable glasses 20 (not shown in FIG. 7).

FIG. 8 is a perspective view illustrating a portable personal computer equipped with the electro-optical device 10. The personal computer 2000 includes the electro-optical device 10 displaying a variety of images, and a body unit 2010 in which a power switch 2001 and a keyboard 2002 are installed.

FIG. 9 is a perspective view illustrating a portable telephone equipped with the electro-optical device 10. The portable telephone 3000 includes a plurality of operation buttons 3001 and scroll buttons 3002, and the electro-optical device 10 displaying a variety of images. The image displayed on the electro-optical device 10 is scrolled up or down by operating the scroll buttons 3002.

In addition to the devices shown in FIGS. 7 to 9, the electro-optical device according to the aspect of the invention includes such a device as a PDA (Personal Digital Assistant), a digital still camera, a television, a video camera, a car navigation device, a display device (panel) for a car, an electronic organizer, an electronic paper, a calculator, a word processor, a workstation, a television telephone, a POS terminal, a printer, a scanner, a copier, a video player, a device with a touch panel, or the like.

This application claims priority to Japan Patent Application No. 2011-204297 filed Sep. 20, 2011, the entire disclosures of which are hereby incorporated by reference in their entireties.

What is claimed is:

1. An electro-optical device alternately displaying right-eye and left-eye images each of display periods, comprising:

a plurality of pixels arranged corresponding to intersections between a plurality of scan lines and a plurality of signal lines;

a drive circuit applying a voltage according to an assigned grayscale to each of the pixels during each of first and second unit periods of each of display periods in such a manner that the applied voltages to each of the pixels during the first and second unit periods of each of the display periods, respectively, are opposite in polarity, and the drive circuit sequentially selects each of the scan lines and applies the voltage according to the assigned grayscale to each of the pixels corresponding to the scan line in a selection state; and an overdrive control unit enabling the drive circuit to perform overdrive of a compensation grayscale according to a display image during a corresponding display period and to a display image during the immediately preceding display period during each of the first and second unit periods of each of the display periods, during each of the display periods, and the overdrive control unit controlling the overdrive on each of the pixels by the drive circuit in such a manner that, in a case where the assigned grayscale in the display image during one display period and the assigned grayscale in the display image during the display period immediately preceding the one display period are equal to each other, in the pixels corresponding to the first scan line, and the pixels corresponding to the second scan lines selected after the selection of the first scan line among the plurality of scan lines, an amount of overdrive compensation on the pixel corresponding to the second scan line exceeds the amount of overdrive compensation on the pixel corresponding to the first scan line, during one of the display periods.

2. The electro-optical device according to claim 1, further comprising:

a memory unit storing a plurality of adjustment values corresponding to respective positions in the arrangement direction of the plurality of scan lines; and an interpolation unit generating an adjustment value corresponding to each of the scan lines by interpolating the plurality of adjustment values that the memory unit stores, wherein the overdrive control unit adjusts the amount of overdrive compensation on the pixels corresponding to each of the scan lines, according to each of the adjustment values generated by the interpolation unit.

3. The electro-optical device according to claim 1, wherein the overdrive control unit controls the overdrive on each of the pixels by the drive circuit, in such a manner that the amount of overdrive compensation on each of the pixels in the first unit period of each of the display periods exceeds the amount of overdrive compensation on the corresponding pixels during the second unit period following the first unit period of the corresponding display period.

4. An electronic apparatus comprising the electro-optical device according to claim 1.

* * * * *